United States Patent
Hoyne et al.

(10) Patent No.: US 8,126,975 B2
(45) Date of Patent: Feb. 28, 2012

(54) AUTOMATIC CONVERSION OF EMAIL THREADS INTO COLLABORATIVE WORKSPACES

(75) Inventors: Ronan Hoyne, Ongar (IE); Declan Joyce, Gort (IE); Ronan Redican, Ashtown (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/413,738

(22) Filed: Mar. 30, 2009

(65) Prior Publication Data

US 2010/0250683 A1    Sep. 30, 2010

(51) Int. Cl.
    *G06F 15/16* (2006.01)
(52) U.S. Cl. ...................................................... 709/206
(58) Field of Classification Search .................. 709/204, 709/205, 206, 207
    See application file for complete search history.

(56) References Cited

U.S. PATENT DOCUMENTS

2006/0031331 A1* 2/2006 LoBuono et al. ............. 709/206
(Continued)

FOREIGN PATENT DOCUMENTS

WO    2006011857 A2    2/2006
(Continued)

OTHER PUBLICATIONS

IBM. method to manage email threads through relocation to a discussion forum and elimination of continued email delivery. IPCOM000178279D. Jan. 21, 2009.*

(Continued)

*Primary Examiner* — Ajay Bhatia
*Assistant Examiner* — Bryan Lee
(74) *Attorney, Agent, or Firm* — Patents On Demand P.A.; Brian K. Buchheit; Scott M. Garrett

(57) ABSTRACT

Automatic conversion of an email thread (or another form of electronic communication, such as IM chat content) into a collaborative workspace can begin with the detection of the addition of a reply message to an existing email thread by an email conversion handler. The existing email thread can include a main message and one or more reply messages. Satisfaction of user-defined or administrator-defined conversion criteria can then be assessed for the existing email thread. When the conversion criteria are satisfied, the existing email thread can be automatically converted into an artifact of a collaborative workspace contained within a collaborative environment. The collaborative workspace can be specific to the existing email thread. The designated participants of the existing email thread can be members of both the email and collaboration systems, and can be provided access to the collaborative workspace.

19 Claims, 2 Drawing Sheets

U.S. PATENT DOCUMENTS

| | | |
|---|---|---|
| 2006/0085245 A1 | 4/2006 | Takatsuka et al. |
| 2006/0095476 A1 | 5/2006 | Dauer et al. |
| 2006/0168026 A1* | 7/2006 | Keohane et al. .............. 709/206 |
| 2007/0143425 A1* | 6/2007 | Kieselbach et al. .......... 709/206 |
| 2008/0147796 A1 | 6/2008 | Chmara et al. |
| 2009/0006558 A1* | 1/2009 | Taieb et al. ................... 709/206 |
| 2009/0013046 A1* | 1/2009 | Lee et al. ...................... 709/206 |
| 2009/0055483 A1* | 2/2009 | Madan et al. ................. 709/206 |
| 2009/0094340 A1* | 4/2009 | Gillai et al. ................... 709/206 |

FOREIGN PATENT DOCUMENTS

WO 2009151829 A2 12/2009

OTHER PUBLICATIONS

Fuchs, et al., "Teamspace: An Environment for Team Articulation Work and Virtual Meetings", 12th International Workshop on Database and Expert Systems Applications, 2001. Proceedings. Volume, Issue, 2001 pp. 527-531.

* cited by examiner

AUTOMATIC CONVERSION OF EMAIL THREADS INTO COLLABORATIVE WORKSPACES

BACKGROUND

The present invention relates to the field of electronic communications and, more particularly, to the automatic conversion of email threads into collaborative workspaces.

Organizations rely upon a variety of electronic communication systems to conduct daily business. Systems providing communication services such as email and online collaboration environments help to bridge the distances between geographically dispersed users. Email is often the primary means of exchanging and/or distributing information to a group of users.

However, the effectiveness of email exchanges, referred to as threads, tends to decrease as the thread grows. That is, the more replies made by the participants of the email thread, the more difficult it becomes for the participants to absorb and/or organize the data presented within the email thread. Further, the open-nature of email allows for participants to exclude existing participants and include other participants in their replies. This creates additional email threads that are separate from, but related to the original email thread. These additional email threads and the original email thread then continue to grow and consume more storage space within the email system.

A collaborative system is a better option for discussions that have a high amount of activity, such as a large quantity of replies and/or exchanges of large amounts of data. However, at the start of an email thread, the amount of activity the email thread will generate is not known or easily predicted. Once the email thread has progressed to the point where it becomes obvious that a collaboration system is a better medium, participants are faced with transferring the contents of the email thread into the collaboration system manually or foregoing the data of the email thread by starting the topic anew in the collaboration system. Regardless of which option is selected, the data of the email thread is left within the email system until deleted or archived by individual participants, since participants often do not have the means by which to remove the email thread as a whole from the email system once it is no longer needed.

BRIEF SUMMARY

One aspect of the present invention can include a method for automatically converting an email thread into a collaborative workspace. Such a method can begin with the detection of the addition of a reply message to an existing email thread by an email conversion handler. The existing email thread can include a main message and one or more reply messages. Satisfaction of user-defined or administrator-defined conversion criteria can then be assessed for the existing email thread. When the user-defined or administrator-defined conversion criteria are satisfied, the existing email thread can be automatically converted into an artifact of a collaborative workspace contained within a collaborative environment. The collaborative workspace can be specific to the existing email thread. The designated participants of the existing email thread can be members of both the email and collaboration systems, and can be provided access to the collaborative workspace. In one embodiment, converted threads are moved from the email system. Further, subsequent email messages associated with a converted thread can be automatically moved from the email system to the collaborative workspace after an initial conversion takes place. In one embodiment, additional content communicated outside email (e.g., IM chat content) can also be moved to the collaborative workspace.

Another aspect of the present invention can include a system for automatically converting an email thread into a collaborative workspace. Such a system can include an email thread and an email conversion handler. The email thread can encapsulate data that represents an exchange of electronic messages between members of an email system. The electronic messages can include a main message and one or more reply messages, which can optionally contain file attachments. The email conversion handler can be configured to automatically relocate the data of the email thread from the email system into a collaborative workspace of a collaboration system. The data can be stored as an artifact within the collaborative workspace. The designated members of the email thread can be members of the collaboration system. In one embodiment, members can be associated with profiles, where the profiles can define conditions and preferences for converting email threads into a collaborative workspace. The profiles can be handled locally through a desktop policy or centrally, which would allow administrators of an organization (such as administrators in charge of the email server and/or the servers providing the collaborative workspaces) to control conditions for converting email threads.

Yet another aspect of the present invention can include a computer program product for automatically converting an email thread into a collaborative workspace that includes a computer readable storage medium having embedded computer usable program code. The computer usable program code can be configured to detect the addition of a reply message to an existing email thread of an email system. The existing email thread can include a main message and one or more reply messages. The computer usable program code can also be configured to assess the satisfaction of user-defined or administrator-defined conversion criteria by the existing email thread. Additionally, the computer usable program code can be configured to automatically convert the existing email thread into an artifact of a collaborative workspace contained within a collaborative environment, when the user-defined or administrator-defined conversion criteria are satisfied. The collaborative workspace can be specific to the existing email thread. The designated members of the existing email thread can be members of both the email and collaboration systems, and can be provided access to the collaborative workspace.

DETAILED DESCRIPTION

Figure 1:
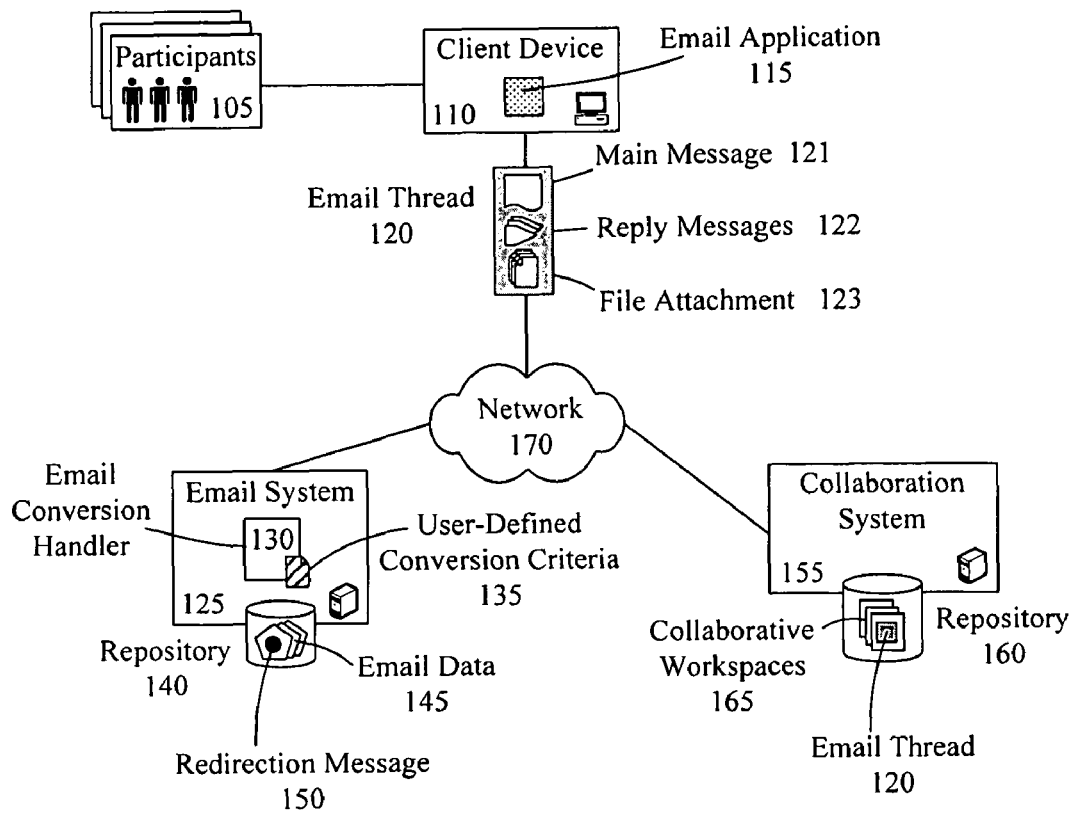
FIG. 1 is a schematic diagram illustrating a system that automatically converts an email thread of an email system into a collaborative workspace of a collaboration system in accordance with embodiments of the inventive arrangements disclosed herein.

The present invention discloses a solution for automatically converting the data of an email thread (or other series of communications, such as IM chat content) into a collaboration workspace of a collaboration system. User-configurable conversion criteria can define the conditions under which an email thread is converted. In one embodiment, the conversion criteria can be defined by a set of policies, which can be implemented as desktop policies and/or centrally administered organizational policies. An email conversion handler can monitor email threads to determine when the conversion criteria have been met. The email conversion handler can then relocate data associated with the email thread into a collaborative workspace created specifically for the email thread. Within the email system, the email thread data can be replaced with a redirection message that informs the participants of the email thread of the conversion to the collaborative workspace. In one embodiment, moving the email thread to the collaborative workspace causes messages related to the thread to be deleted from one or more email servers, which conserves storage space. In one embodiment, once an email thread has been identified for conversion into a collaboration space, subsequent email messages associated with the thread can be automatically moved to the collaboration space when received by an email server.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that automatically converts an email thread 120 of an email system 125 into a collaborative workspace 165 of a collaboration system 155 in accordance with embodiments of the inventive arrangements disclosed herein. In system 100, an email thread 120 can be automatically relocated from the email system 125 into a collaboration system 155 by an email conversion handler 130.

Participants 105 can utilize an email application 115 associated with the email system 125 running from a client device 110 to perform actions upon an email thread 120. The client device 110 can be an electronic computing device capable of running the email application 115, such as a personal computer or mobile phone. The email application 115 can represent a software program configured to allow a participant 105 to execute the various functions of the email system 125.

An email thread 120 can represent a series of electronic communications between participants 105 of the email system 125. The email thread 120 can be stored by the email system 125 in a repository 140 and can include a main message 121, one or more reply messages 122, and any included file attachments 123. The main message 121 can correspond to the originating message of the email thread 120. The reply messages 122 can represent responses made by the participants 105 of the main message 121 and/or subsequent reply messages 122. File attachments 123 can be contained within the main message 121 and/or the reply messages 122.

The email system 125 can represent the hardware and/or software components necessary to support the use of email by the participants 105. In addition to the basic elements, the email system 125 can include an email conversion handler 130. The email conversion handler 130 can represent a software system and/or application configured to automatically convert an email thread 120 to a collaborative workspace 165. In one embodiment, conversion of the email content to the collaborative workspace 165 can modify a format of the email messages and/or attachments. For example, email messages conforming to an OUTLOOK specific format can be converted into a PDF format, which can be easier for collaborating participants 105 to utilize due to its more standardized nature.

In another contemplated embodiment, the email conversion handler 130 can operate from a server or system external to the email system 125. In such an embodiment, the server or system from which the email conversion handler 130 operates can be configured to communicate with the email system 125 and collaboration system 155 over the network 170.

To determine when an email thread 120 should be converted, the email conversion handler 130 can utilize a set of user-defined (or administrator-defined) conversion criteria 135. Alternatively, conversion of an email thread 120 can occur responsive to user input (e.g., manual trigger, such as selected a GUI button established for this purpose). The user-defined conversion criteria 135 can represent one or more assessable conditions that, when determined as satisfied by the email thread 120, trigger the conversion of the email thread 120 to the collaborative workspace 165.

Examples of assessable conditions can include, but are not limited to, the quantity of reply messages 122, the amount of storage space consumed by the email thread 120, the quantity of active participants 105, the amount of time that has elapsed from the transmission of the main message 121, a combination of one or more of these conditions, and the like. Additionally, the user-defined conversion criteria 135 can utilize BOOLEAN logic to create conditions that are more complex.

The email conversion handler 130 can be configured to assess email threads 120 for satisfaction of the user-defined conversion criteria 135 in various manners, based on implementation and/or business preferences. For example, the email thread 120 can assessed when a participant 105 selects an option to create a reply message 122 for the email thread 120 and/or when the email system 125 is experiencing a shortage of storage space.

The user-defined conversion criteria 135 can be configured via a user interface (not shown) that can be presented to an administrator of the email system 125 and/or to a participant 105 having the proper privileges within the email application 115. Further, restrictions to the modification of user-defined conversion criteria 135 can be proliferated using policies and/or user profiles. The policies and/or profiles can be locally applied and managed (e.g., desktop policies applied at the client device 110) or can be centrally applied and managed (e.g., organizational policies handled by a designated administrator). Use of organizational policies can permit an administrator to control which triggers and conditions result in email (or other messaging) content to be moved to the collaborative workspaces 165.

Over time, participants 105 can continue to interact with the email thread 120 by adding reply messages 122 and/or file attachments 123. When the email thread 120 satisfies the user-defined conversion criteria 135, the email conversion handler 130 can be invoked to relocate the email data 145 for the email thread 120 from the email system 125 to the collaboration system 155. In one embodiment, once an email thread 120 has been selected for conversion to the collaborative workspace 165, subsequent related email messages (additional to the ones in an original thread) can also be moved to the collaborative workspace automatically.

When conversion of the email thread 120 is determined, the email conversion handler 130 can communicate with the collaboration system 155 to create a collaborative workspace 165 for the email thread 120. The email data 145 corresponding to the email thread 120 can then be moved into the repository 160 of the collaboration system 155 and associated with the created collaborative workspace 165. In this situation, the email data 145 can be considered to be stored as an artifact of the collaborative workspace 165.

Once the collaborative workspace 165 is created, the participants 105 of the email thread 120 can be provided access to the new collaborative workspace 165. Association can be achieved by correlating the email addresses of the participants 105 from the email thread 120 with those contained in the collaboration system 155. If a participant 105 is not registered with the collaboration system 155, the email conversion handler 130 can be configured to send notice of such exceptions to a designated participant 105 or administrator for resolution.

Conversion of the email thread 120 can also include removal of the associated email data 145 from the repository 140. Since this is an automated process, many participants 105 may be unaware that the email thread 120 has been converted to a collaborative workspace 165. Thus, the email conversion handler 130 can replace the email data 145 of the email thread 120 with a redirection message 150.

The redirection message 150 can take the place of the email thread 120 within the repository 140. Information can be included in the redirection message 150 to notify the participant 105 that the email thread 120 has been converted. For example, the redirection message 150 can contain a hyperlink or path location to the collaborative workspace 165, the name of the collaborative workspace 165, and/or a listing of participants 105. In one embodiment, the removal of data 145 from repository 140 can occur after a predefined delay and/or set of conditions are satisfied to ensure that email recipients 115 are not confused by the moving of the email thread to the collaborative workspace 165. In one embodiment, specifics of whether email data 145 is to be deleted from repository 140 and/or changed responsive to a move to the collaborative workspace 165 can be configured to suit administrator and/or participant 105 preferences.

It should be noted that the redirection message 150 is considerably smaller in size, and, therefore, storage space consumption, than the email thread 120. Thus, the majority of storage space consumed by the email thread 120 can be reclaimed for use by the email system 125. This is of note since the data 145 of the email thread 120 can be stored in multiple mailboxes within the repository 140.

It is important to emphasize that an automated mechanism is not currently available in known existing art (outside the instant disclosure) to convert email threads into collaborative workspaces. Conventional systems would utilize a manual process, which may not be able to remove all of the associated email data 145 from the repository 140. Further, the user-defined conversion criteria 135 can establish a uniform selection process for email threads 120.

As used herein, presented repositories 140 and 160 can be a physical or virtual storage space configured to store digital information. Repositories 140 and 160 can be physically implemented within any type of hardware including, but not limited to, a magnetic disk, an optical disk, a semiconductor memory, a digitally encoded plastic memory, a holographic memory, or any other recording medium. The repositories 140 and/or 160 can be a stand-alone storage unit as well as a storage unit formed from a plurality of physical devices. Additionally, information can be stored within repositories 140 and 160 in a variety of manners. For example, information can be stored within a database structure or can be stored within one or more files of a file storage system, where each file may or may not be indexed for information searching purposes. Further, repositories 140 and/or 160 can utilize one or more encryption mechanisms to protect stored information from unauthorized access.

Network 170 can include any hardware/software/and firmware necessary to convey data encoded within carrier waves. Data can be contained within analog or digital signals and conveyed though data or voice channels. Network 170 can include local components and data pathways necessary for communications to be exchanged among computing device components and between integrated device components and peripheral devices. Network 170 can also include network equipment, such as routers, data lines, hubs, and intermediary servers which together form a data network, such as the Internet. Network 170 can also include circuit-based communication components and mobile communication components, such as telephony switches, modems, cellular communication towers, and the like. Network 170 can include line based and/or wireless communication pathways.

Although examples presented herein are focused upon email threads 120 associated with an email system 125 it should be understood that the disclosure is not so limited. That is, any series of electronic communications (e.g., IM chat content, blog discussions, voice mail files, e-faxes, etc.) can be moved to a collaborative workspace 165 in accordance with the inventive arrangements disclosed herein. Additionally, multiple types of different messages related to a central topic (e.g., thread) can be converted together and grouped into a single collaborative workspace 165. For example, email messages associated with a thread, related blog discussions, and/or related IM chat content can each be moved to a single collaborative workspace 165 responsive to a triggering event.

Figure 2:
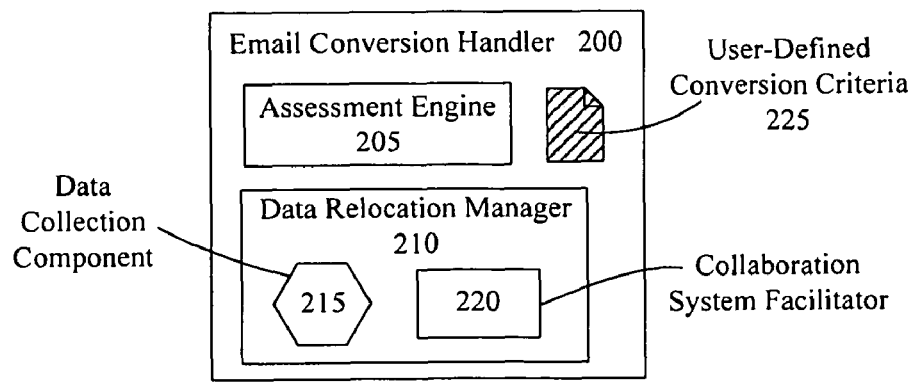
FIG. 2 is a schematic diagram abstracting an email conversion handler in accordance with an embodiment of the inventive arrangements disclosed herein.

FIG. 2 is a schematic diagram abstracting an email conversion handler 200 in accordance with an embodiment of the inventive arrangements disclosed herein. The email conversion handler 200 can be utilized within the context of system 100.

The email conversion handler 200 can represent a software system and/or application configured to automatically convert an email thread to a collaborative workspace. To perform this task, the email conversion handler 200 can include an assessment engine 205, a data relocation manager 210, and user-defined conversion criteria 225.

The assessment engine 205 can represent the component of the email conversion handler 200 that determines when an email thread satisfies the user-defined conversion criteria 225. For example, if a user-defined conversion criterion 225 is ten reply messages, then the assessment engine 205 can determine the quantity of reply messages contained within the email thread.

Once values for the user-defined conversion criteria 225 have been determined for the email thread, the assessment engine 205 can then determine if the email thread should be converted to a collaborative workspace. For example, of the ten user-defined conversion criteria 225, the email thread has satisfied four, but conversion of an email thread requires that six user-defined conversion criteria 225 be met. Thus, the assessment engine 205 would not initiate the conversion of this email thread.

When the assessment engine 205 determines the need for an email thread to be converted, the data relocation manager 210 can be invoked. The data relocation manager 210 can represent a component of the email conversion handler 200 configured to handle relocation the data of the email thread from the email system to the collaboration system. For this task, the data relocation manager 210 can include a data collection component 215 and a collaboration system facilitator 220.

The data collection component 215 can be configured aggregate the data for the email thread being relocated. For example, the data collection component 215 can retrieve all the copies from the repository of the email system, including related threads that have branched off, and consolidate the copies into a data composite of the email thread. As part of data aggregation, the data collection component 215 can also create a consolidated list of users participating in the email thread so they can be given access to the collaborative workspace. In one embodiment, additional related content, such as IM chat content, blog discussion content, etc. related to an email thread can also be aggregated into a consolidated workspace at this time.

Additionally, the data collection component 215 can be configured to perform any format changes to the aggregated email thread data necessary for the storage within the collaboration system. For example, the HyperText Markup Language (HTML) format of the email thread retrieved and consolidated may result in a file whose size is too large for the collaboration system. The data collection component 215 can be configured to execute a resolution measure, such as converting the HTML to text or separating the email thread into two smaller files, in order to bring the email thread data into compliance with the collaboration system. Additionally, proprietary formats can be converted to more standardized ones (e.g., PDF formats, XML formats, etc.) to ensure that all participants are able to view/interact with collaborative content without requiring specialized applications that may not be loaded upon their client devices.

Since the data collection component 215 is tasked with finding the email thread data, it can also be configured to replace the data with the redirection message after the data has been moved into the collaborative workspace. That is, because the data collection component 215 identifies the storage locations of the email thread data within the repository of the email system, it can also be configured to utilize this information to replace the data with the redirection message.

The collaboration system facilitator 220 can be the interface mechanism for the email conversion handler 200 and the target collaboration system. For example, the collaboration system facilitator 220 can be configured to execute commands within the collaboration system such as creating the collaborative workspace. Commands for the collaboration system can utilize an application programming interface (API) associated with the collaboration system or another comparable medium supported by the collaboration system.

It should be appreciated that the email conversion handler 200 although focusing upon email content can be adapted for handling other content types. For example, an IM handler having functionality similar to the email conversion handler 200 can be included in an IM server and used to convert IM chat content into collaborative workspace content.

Figure 3:
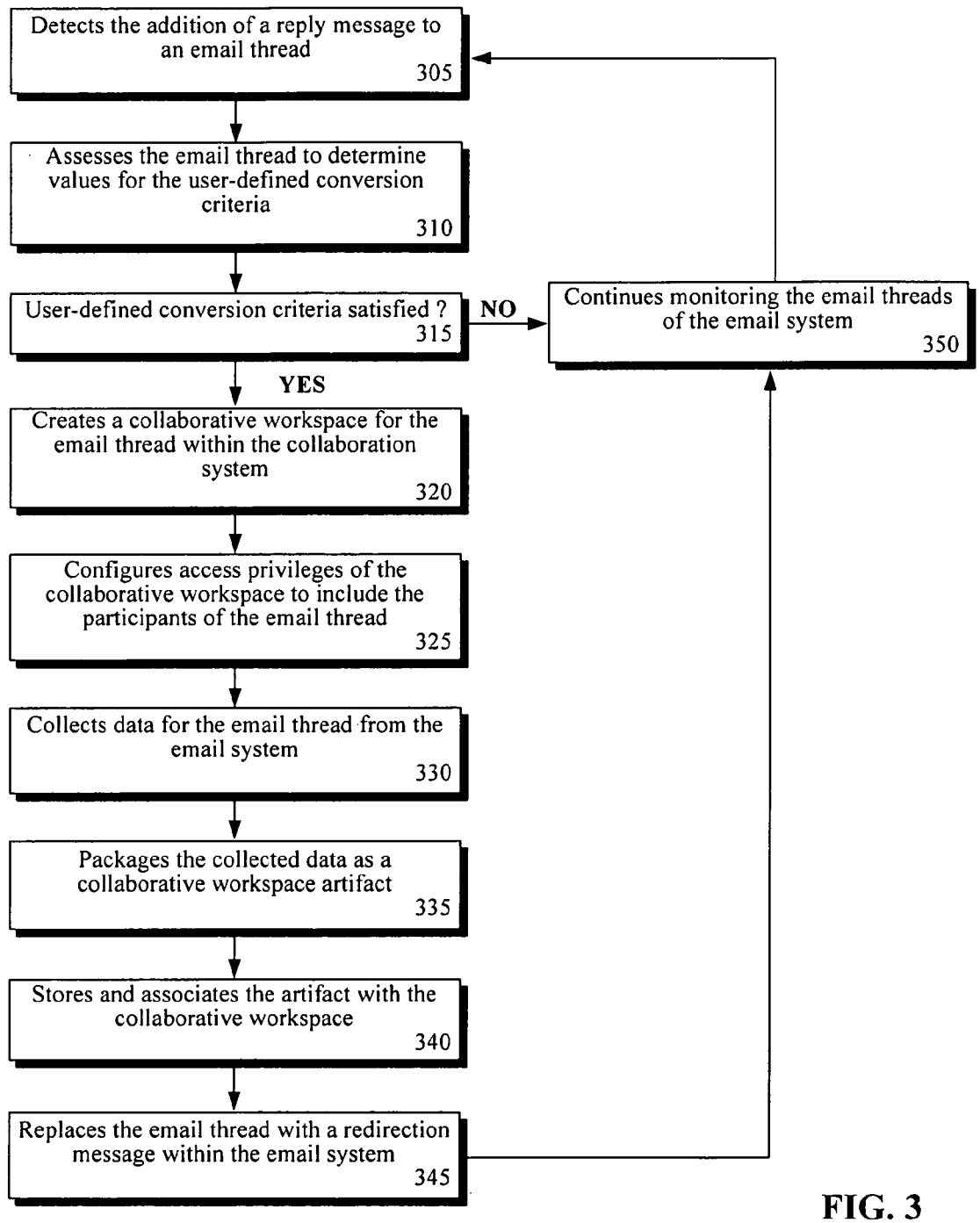
FIG. 3 is a flow chart of a method detailing the conversion of an email thread by an email conversion handler in accordance with an embodiment of the inventive arrangements disclosed herein.

FIG. 3 is a flow chart of a method 300 detailing the conversion of an email thread by an email conversion handler in accordance with embodiments of the inventive arrangements disclosed herein. Method 300 can be executed within the context of system 100 and/or using email conversion handler 200. Steps shown in method 300 can be adapted to other content types (such as IM chat content) when a set of messages of those types are to be moved to a collaborative workspace.

Method 300 can begin in step 305 where the email conversion handler can detect the addition of a reply message to an email thread. The email thread can then be assessed to determine values for the user-defined (or administrator-defined) conversion criteria in step 310. In step 315, it can be determined if the user-defined conversion criteria have been satisfied.

When the email thread does not satisfy the user-defined conversion criteria, flow can proceed to step 350 where the email conversion handler can continue to monitor the email threads of the email system. From step 350, flow can return to step 305.

When the email thread satisfies the user-defined conversion criteria, then step 320 can execute where a collaborative workspace can be created for the email thread within the collaboration system. The access privileges of the collaborative workspace can be configured to include the participants of the email thread in step 325.

In step 330, the data for the email thread can be collected from the email system. The collected data can be packaged as an artifact for the collaborative workspace in step 335. In step 340, the artifact can then be stored and associated with the collaborative workspace.

The email thread can be replaced with a redirection message in the email system in step 345. From step 345, flow can proceed to step 350 where the email conversion handler can continue to monitor the email threads of the email system. In one embodiment, once an email thread has been converted to a collaborative workspace, subsequent email communications associated with that thread can be automatically moved to the collaborative workspace. From step 350, flow can return to step 305.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically converting an email thread into a collaborative workspace comprising:

detecting an addition of a reply message to an existing email thread of an email system by an email conversion handler, wherein said existing email thread comprises a main message and at least one reply message;

when user-defined conversion criteria are satisfied, automatically converting the existing email thread into an artifact of a collaborative workspace within a collaborative environment, wherein said collaborative workspace is specific to the existing email thread, wherein said collaborative workspace contains an identifier associated with the existing email thread, wherein designated participants of the existing email thread are provided access to the collaborative workspace, wherein the designated participants are members of the email system;

copying data associated with the existing email thread from the email system into the created collaborative workspace, wherein said data comprises message contents and file attachments associated with the existing email thread; and replacing the existing email thread within the email system repository with a redirection message, wherein the redirection message informs the designated participants of the creation of the collaborative workspace for the existing email thread.

2. The method of claim 1, wherein assessing satisfaction of the user-defined conversion criteria further comprises:

for each user-defined conversion criterion, determining from the existing email thread a data value corresponding to a user-defined conversion criterion; and comparing the determined data value of the existing email thread against a threshold value for the user-defined conversion criterion.

3. The method of claim 1, wherein the user-defined conversion criteria comprise at least one of a quantity of reply messages, an amount of storage space consumed by the existing email thread, an amount of elapsed time from transmission of the main message, a quantity of designated participants having replied to the main message, and a current performance level of the email system.

4. The method of claim 1, wherein the replacement of the existing email thread further comprises:

identifying a location of the existing email thread within a repository of the email system;

deleting the message contents associated with the existing email thread at the identified location within the repository; and inserting the redirection message into the repository at the identified location.

5. The method of claim 4, when distinct versions of the existing email thread are stored by the email system within separate user mailboxes corresponding to each designated participant, further comprising:

repeating the identification of the location, deletion of the data, and insertion of the redirection message for each user mailbox associated with the existing email thread.

6. The method of claim 1, when distinct versions of the existing email thread are stored by the email system within separate user mailboxes corresponding to each designated participant, further comprising:

prior to copying the data, aggregating the distinct versions of the existing email thread to form a composite email thread, wherein said composite email thread comprises all reply messages and file attachments from the distinct versions of the existing email thread.

7. The method of claim 1, wherein the copying of the existing email thread further comprises:

collecting the data of the existing email thread from corresponding repositories;

packaging the collected data as an artifact of the collaboration system; and storing the artifact within a repository of the collaboration system, wherein the artifact is associated with the collaborative workspace.

8. The method of claim 1, wherein the automatic conversion of the existing email thread executes in response to a user-selected command from within an interface associated with the email conversion handler presented within an email application of the email system.

9. The method of claim 1, wherein the redirection message comprises at least one of a members list for the collaborative workspace, an identifier associated with the collaborative workspace, and a location of the collaborative workspace.

10. A system comprising hardware and software for automatically converting an email thread into a collaborative workspace comprising:

an email thread configured to encapsulate data representing an exchange of electronic messages between designated members of an email system, wherein the electronic messages comprise a main message and at least one reply message, wherein one of the main message and the at least one reply optionally contains a file attachment; and an email conversion handler, stored on at least one non-transitory storage medium and having instructions executable by at least one processor, configured to detect an addition of a reply message to an existing email thread of an email system and to relocate the data of the email thread from the email system into a collaborative workspace of a collaboration system when at least one user defined conversion criterion is satisfied, wherein the relocation of said data involves replacing the existing email thread within the email system repository with a redirection message, wherein said data is stored as an artifact of the collaborative workspace, and, wherein the designated members of the email thread are members of the collaboration system.

11. The system of claim 10, wherein the said the email conversion handler further comprises: at least one user-defined conversion criterion configured to define a threshold value for an assessable characteristic of the email thread;

an assessment engine, stored on at least one non-transitory storage medium and having instructions executable by at least one processor, configured to evaluate satisfaction of the at least one user-defined conversion criterion, wherein the assessment engine analyzes the email thread to determine a value for the assessable characteristic, and, wherein satisfaction of the at least one user-defined conversion criterion initiates relocation of the email thread to the collaboration system; and a data relocation manager, stored on at least one non-transitory storage medium and having instructions executable by at least one processor, configured to handle transferring the email thread data from the email system to the collaboration system.

12. The system of claim 11, wherein the data relocation manager further comprises:

a data collection component, stored on at least one non-transitory storage medium and having instructions executable by at least one processor, configured to aggregate the data associated with the email thread, wherein said data comprises contents of the electronic messages and a copy of each file attachment, wherein the electronic messages of the email thread are replaced with a redirection message to the collaborative workspace, wherein the redirection message informs the designated participants of the creation of the collaborative workspace for the existing email thread; and a collaboration system facilitator, stored on at least one non-transitory storage medium and having instructions executable by at least one processor, configured to handle interactions with the collaboration system during relocation of the email thread to the collaborative workspace, wherein said interactions comprise at least one of a creation of the collaborative workspace, a storage of the aggregated data within a repository of the collaboration system, an association of the stored data with the collaborative workspace, and a specification of members to access the collaborative workspace.

13. The computer program product of claim 12, wherein the data collection component is further configured to:
identify a location of the existing email thread within a repository of the email system;
delete the message contents associated with the existing email thread at the identified location within the repository; and
insert the redirection message into the repository at the identified location.

14. The computer program product of claim 13, wherein the replacement of the existing email thread further comprises:
computer usable program code stored in the non-transitory storage medium configured to identify a location of the existing email thread within a repository of the email system;
computer usable program code stored in the non-transitory storage medium configured to delete the message contents associated with the existing email thread at the identified location within the repository; and
computer usable program code stored in the non-transitory storage medium configured to insert the redirection message into the repository at the identified location.

15. The computer program product of claim 13, wherein the copying of the existing email thread further comprises:
computer usable program code stored in the non-transitory storage medium configured to collect the data of the existing email thread from corresponding repositories;
computer usable program code stored in the non-transitory storage medium configured to package the collected data as an artifact of the collaboration system; and
computer usable program code stored in the non-transitory storage medium configured to store the artifact within a repository of the collaboration system, wherein the artifact is associated with the collaborative workspace.

16. The system of claim 11, wherein the at least one user-defined conversion criterion comprises at least one of a quantity of reply messages, an amount of storage space consumed by the email thread, an amount of elapsed time from transmission of the main message, and a quantity of members having replied to the main message.

17. The system of claim 10, wherein the email conversion handler is automatically invoked by the assessment engine in response to the satisfaction of the at least one user-defined conversion criterion.

18. A computer program product for automatically converting an email thread into a collaborative workspace comprising a non-transitory computer readable storage medium having computer usable program code embodied therewith, the computer usable program code comprising:
computer usable program code stored in the non-transitory storage medium configured to detect an addition of a reply message to an existing email thread of an email system, wherein said existing email thread comprises a main message and at least one reply message;
computer usable program code stored in the non-transitory storage medium configured to, when user-defined conversion criteria are satisfied, automatically convert the existing email thread into an artifact of a collaborative workspace within a collaborative environment, wherein said collaborative workspace is specific to the existing email thread, wherein said collaborative workspace contains an identifier associated with the existing email thread, wherein designated participants of the existing email thread are provided access to the collaborative workspace, and wherein the designated participants are members of the email system,
computer usable program code stored in the non-transitory storage medium configured to copy data associated with the existing email thread from the email system into the created collaborative workspace, wherein said data comprises message contents and file attachments associated with the existing email thread; and
computer usable program code stored in the non-transitory storage medium configured to replace the existing email thread within the email system repository with a redirection message, wherein the redirection message informs the designated participants of the creation of the collaborative workspace for the existing email thread.

19. The computer program product of claim 18, wherein assessing satisfaction of the user-defined conversion criteria further comprises:
computer usable program code stored in the non-transitory storage medium configured to determine from the existing email thread a data value corresponding to a user-defined conversion criterion for each user-defined conversion criterion; and
computer usable program code stored in the non-transitory storage medium configured to compare the determined data value of the existing email thread against a threshold value for the user-defined conversion criterion.

* * * * *